United States Patent
Naito et al.

(10) Patent No.: US 12,406,246 B2
(45) Date of Patent: Sep. 2, 2025

(54) INFORMATION PROCESSING DEVICE AND METHOD

(71) Applicant: TOSHIBA TEC KABUSHIKI KAISHA, Tokyo (JP)

(72) Inventors: Hidehiro Naito, Shizuoka (JP); Takuya Takasu, Shizuoka (JP); Tomonori Sugiyama, Kanagawa (JP); Ichiro Fukuzawa, Tokyo (JP); Hiroki Takeda, Saitama (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 742 days.

(21) Appl. No.: 17/727,229

(22) Filed: Apr. 22, 2022

(65) Prior Publication Data

US 2023/0034362 A1 Feb. 2, 2023

(30) Foreign Application Priority Data

Jul. 27, 2021 (JP) .................................. 2021-122361

(51) Int. Cl.
  *G06Q 20/20* (2012.01)
  *G06K 7/10* (2006.01)
  *G06K 7/14* (2006.01)

(52) U.S. Cl.
  CPC ....... *G06Q 20/208* (2013.01); *G06K 7/10722* (2013.01); *G06K 7/1417* (2013.01); *G06K 7/1434* (2013.01); *G06Q 20/202* (2013.01)

(58) Field of Classification Search
  CPC .. G06Q 20/208; G06Q 20/202; G06Q 20/387; G06K 7/10722; G06K 7/1417; G06K 7/1434; G07G 1/0045
  See application file for complete search history.

(56) References Cited

U.S. PATENT DOCUMENTS

| 11,257,198 B1* | 2/2022 | Holub ................... G06V 10/82 |
| 11,636,565 B1* | 4/2023 | Evans ................... G06T 1/0042 |
| | | 382/103 |

(Continued)

FOREIGN PATENT DOCUMENTS

JP 2021-056953 A 4/2021

*Primary Examiner* — Michael Jared Walker
(74) *Attorney, Agent, or Firm* — FOLEY & LARDNER LLP

(57) ABSTRACT

According to embodiments, a device includes a camera configured to read a symbol attached to a commodity and capture an image containing discount information attached to the commodity; a commodity information storage configured to store information regarding the commodity acquired by reading the symbol attached to the commodity; a first evaluator configured to determine whether prior commodity information stored in the commodity information storage includes information related to invisible information, in response to reading discount information attached to the commodity; a second evaluator configured to determine whether commodity identification information included in the discount information is identical to commodity identification information included in the information related to the invisible information, in response to the first evaluator determining that the prior commodity information stored in the commodity storage includes the information related to the invisible information; and an output generator configured to output information related to the discount information.

20 Claims, 8 Drawing Sheets

(56) References Cited

U.S. PATENT DOCUMENTS

| | | | |
|---|---|---|---|
| 2005/0151616 A1* | 7/2005 | Nakazawa | G06K 19/07749 235/492 |
| 2005/0151617 A1* | 7/2005 | Nakazawa | G06K 19/07703 235/492 |
| 2012/0000980 A1* | 1/2012 | Suzuki | G07G 1/0045 235/454 |
| 2012/0054052 A1* | 3/2012 | Wakebe | G06Q 30/04 705/23 |
| 2012/0055994 A1* | 3/2012 | Yanagi | G07G 1/12 235/454 |
| 2012/0104087 A1* | 5/2012 | Iizaka | G07G 1/0045 235/375 |
| 2012/0104098 A1* | 5/2012 | Matsuda | G07G 1/0045 235/462.01 |
| 2012/0327202 A1* | 12/2012 | Nagamachi | G07G 1/145 348/61 |
| 2013/0058541 A1* | 3/2013 | Susaki | G06V 20/52 382/110 |
| 2013/0271562 A1* | 10/2013 | Kim | G06V 10/143 348/33 |
| 2014/0067574 A1* | 3/2014 | Miyakoshi | G06Q 20/208 705/23 |
| 2018/0174126 A1* | 6/2018 | Naito | G06V 20/00 |
| 2018/0240129 A1* | 8/2018 | Chuptys | G06K 7/1417 |
| 2018/0276638 A1* | 9/2018 | Gonda | G06Q 20/3276 |
| 2020/0342446 A1* | 10/2020 | Mullen | G06Q 30/0207 |
| 2021/0103949 A1* | 4/2021 | Mullen | G06K 19/0708 |
| 2022/0374858 A1* | 11/2022 | Naito | G06K 7/14 |

* cited by examiner

INFORMATION PROCESSING DEVICE AND METHOD

CROSS-REFERENCE TO RELATED APPLICATION

This application is based upon and claims the benefit of priority from Japanese Patent Application No. 2021-122361, filed on Jul. 27, 2021, the entire contents of which are incorporated herein by reference.

FIELD

Embodiments described herein relate generally to an information processing device and a method.

BACKGROUND

In the related art, for example, symbols such as barcodes or two-dimensional codes are printed on commodities, or printed labels are attached to commodities in stores where the commodities are sold. Information processing devices such as point of sales (POS) terminals read symbols attached to commodities and perform commodity registration processes.

Operators who operate POS terminals face surfaces (to which symbols are attached) toward code readers to read the symbols. Therefore, the operators spend time searching for the surfaces to which the symbols are attached.

In recent years, to reduce such time spent searching by operators, technologies have been created for printing electronic watermarks in which invisible information symbols are embedded on commodities. The invisible information is read with code readers. Since the electronic watermarks are invisible to human eyes, the digital watermarks are printed on a plurality of portions on commodities, improving the operability of reading the invisible information by operators. In addition, designability of commodities can be improved.

Incidentally, if prices of commodities are discounted, discount seals are attached to the commodities. If symbols printed in discount seals are read by operators, the commodities can be sold at discount prices with POS terminals.

However, for example, if discount seals are attached to commodities in which electronic watermarks are attached to a plurality of surfaces, code readers read invisible information before reading the discount seals and continuously read the discount seals. Accordingly, double registration may occur, in which a commodity registration process is performed twice on the commodities with POS terminals.

DETAILED DESCRIPTION

Disclosed herein are systems and methods to prevent double registration of commodities due, for example, to invisible information and discount seals.

In general, according to some embodiments, an information processing device includes a camera configured to read a symbol attached to a commodity and capture an image containing discount information attached to the commodity; a commodity information storage configured to store information regarding the commodity acquired by reading the symbol attached to the commodity; a first evaluator configured to determine whether prior commodity information stored in the commodity information storage includes information related to invisible information, in response to reading discount information attached to the commodity; a second evaluator configured to determine whether commodity identification information included in the discount information is identical to commodity identification information included in the information related to invisible information, in response to the first evaluator determining that the prior commodity information stored in the commodity storage includes the information related to invisible information; and an output generator configured to output information related to the discount information, in response to the second evaluator determining that the commodity identification information included in the discount information is identical to the commodity identification information included in the information related to the invisible information.

First Embodiment

Hereinafter, an information processing device and a method according to a first embodiment will be described with reference to the appended drawings. In the first embodiment, a POS terminal will be described as an example of the information processing device. It should be appreciated that the first embodiment is an example embodiment of the information processing device, and the method, configurations, functions, and the like do not limit to the example embodiment.

First, an electronic watermark will be described. An electronic watermark is a technology for embedding information regarding an image, in the image, in an invisible state (or a state in which information is hard to be seen). Information that looks like nothing is written at a glance (by the human eye) can be extracted using dedicated software. In the case of a commodity, a symbol such as a barcode or a two-dimensional code is embedded as invisible information (e.g., information invisible to a human eye) on a box or a package.

Figure 1:
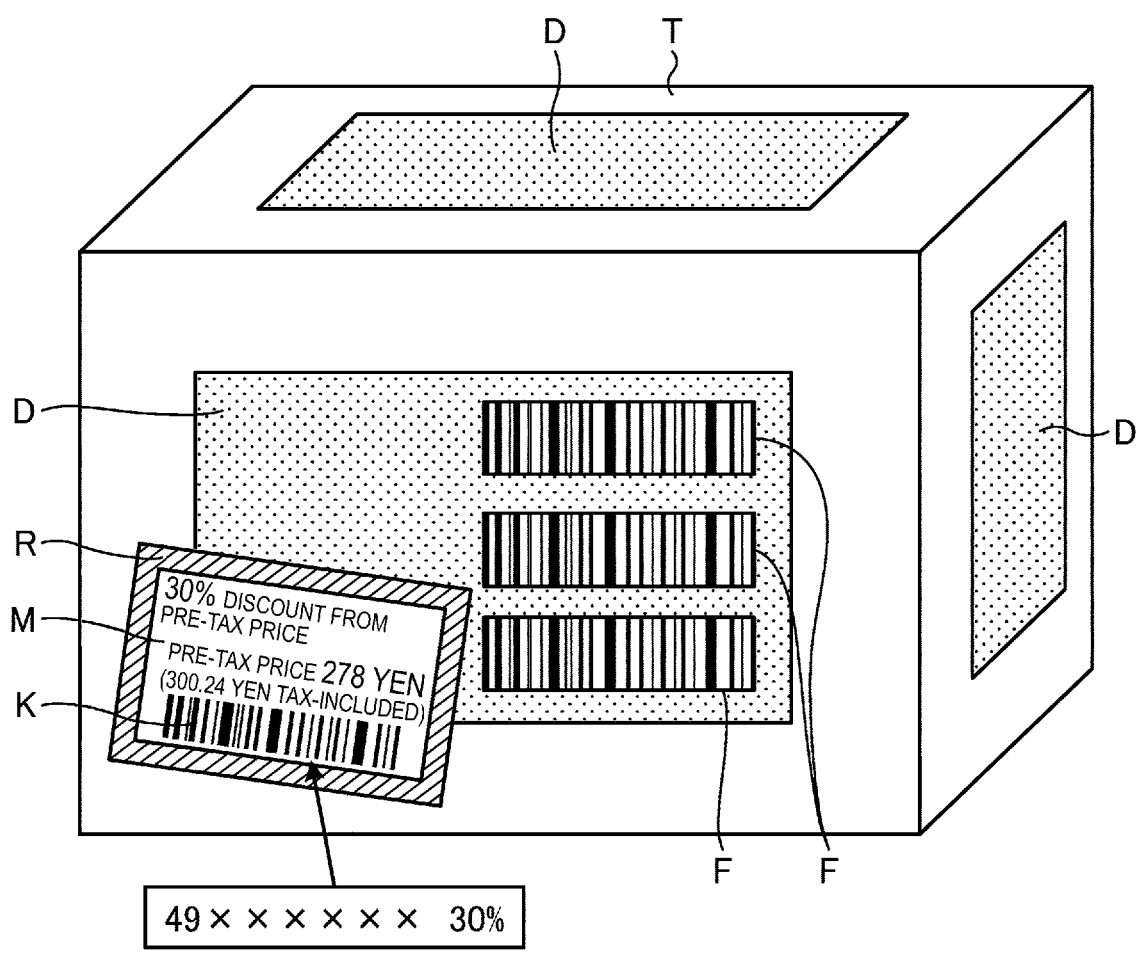
FIG. 1 is a diagram illustrating an example of a commodity according to a first embodiment.

FIG. 1 is a diagram illustrating an example of a commodity according to the first embodiment. As illustrated in FIG. 1, an electronic watermark D is printed on a plurality of surfaces of a commodity T. Since the electronic watermark D is invisible or hard to be seen with human eyes, design of a package of the commodity T is not interrupted. In FIG. 1, a symbol is printed as invisible information F. As illustrated in FIG. 1, the invisible information F is visible (seen with eyes) for description, however, the invisible information F is actually unseen with human eyes. As illustrated in FIG. 1, the invisible information F is printed on one side surface of the commodity T, however, the invisible information F is actually printed on a plurality of surfaces of the commodity T as the electronic watermark D. A symbol such as a barcode or a two-dimensional code includes a commodity code (commodity identification information) which is a code for identifying the commodity T or information for acquiring the commodity code. In the following description, the invisible information F may include a commodity code.

When discounting a price of the commodity T, a discount seal R is attached to any one side surface of the commodity T. The discount seal R has a discount information description portion M and a symbol portion K. In the discount information description portion M, a pre-tax price, a tax-included price, and information regarding discount (in FIG. 1, information about "30% discount from the pre-tax price") of the commodity T are printed. In the symbol portion K, for example, a symbol such as a barcode is printed. The symbol printed in the symbol portion K includes, among other information, information regarding a commodity code and information regarding the discount. In the following description, the symbol printed in the symbol portion K is assumed to include a commodity code (e.g., "49xxxxxx" illustrated in FIG. 1) and information regarding the discount (e.g., information about "30%" indicating a discount of 30% as illustrated in FIG. 1). The information printed in the discount information description portion M and the symbol portion K is visible information and information seen/visible with human eyes. The discount seal R attached to the commodity T overlaps a part of the invisible information F in some cases. However, since the plurality of pieces of invisible information F are printed on the plurality of surfaces of the commodity T, there is no influence/interruption on reading of the invisible information F by a code reader.

Figure 2:
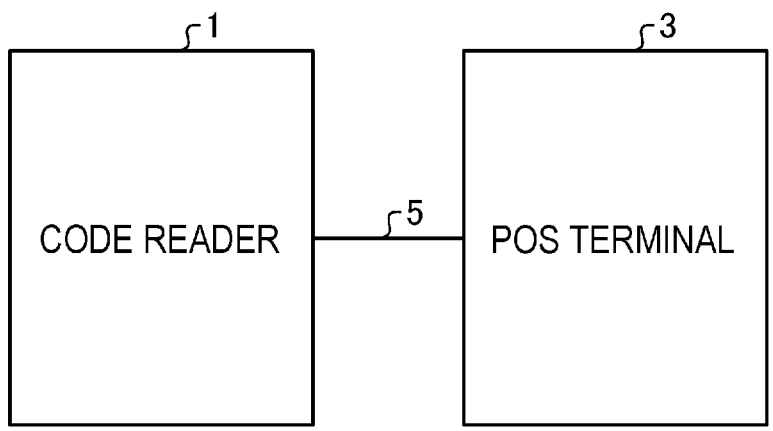
FIG. 2 is a diagram illustrating a connection relation between a code reader and a POS terminal, according to some embodiments.

Hereinafter, a code reader and a POS terminal will be described. FIG. 2 is a diagram illustrating a connection relation between a code reader 1 and a POS terminal 3, according to some embodiments. As illustrated in FIG. 2, the code reader 1 and a POS terminal 3 are connected via a dedicated connection line 5.

Figure 3:
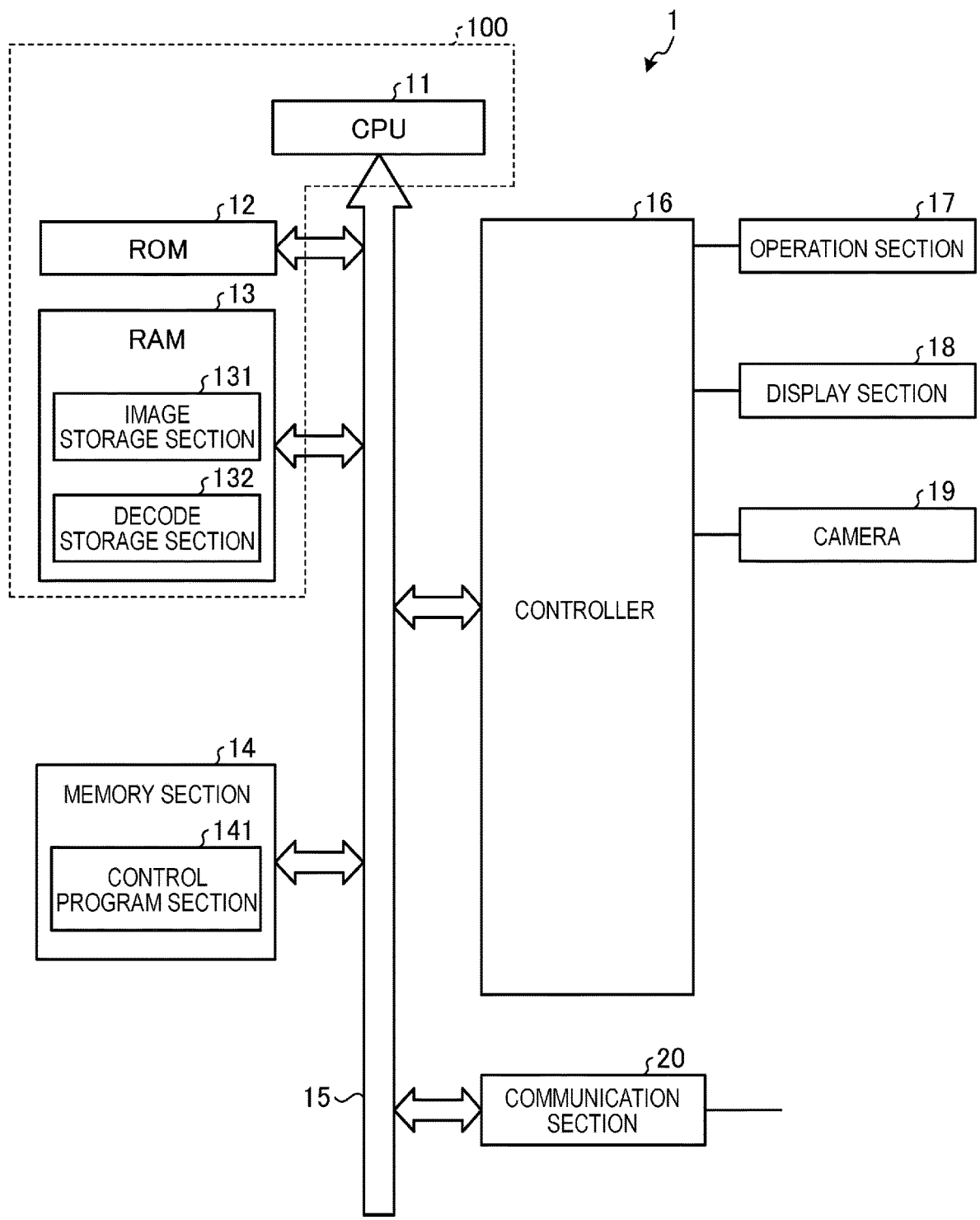
FIG. 3 is a block diagram illustrating an example of a hardware configuration of the code reader, according to some embodiments.

The code reader 1 includes a camera 19 (see FIG. 3). The camera 19 includes a light-receiving sensor configured with a charge coupled device (CCD) or a complementary metal oxide semiconductor (CMOS). The code reader 1 is, for example, a stationary type scanner or a handy type touch scanner.

The code reader 1 recognizes information regarding the electronic watermark D attached to the commodity T from an image of the commodity T captured by the camera 19. Then, the code reader 1 reads the invisible information F recorded on the recognized electronic watermark D. The code reader 1 reads the symbol printed on the discount seal R and attached to the commodity T from the image of the commodity T captured by the camera 19.

The code reader 1 stores a dedicated program A for reading the invisible information F and a dedicated program B for reading a visible symbol. The code reader 1 starts the program A, recognizes the electronic watermark D, and reads the invisible information F. The code reader 1 starts the program B and reads the visible symbol, that is, the symbol printed on the discount seal R. The code reader 1 starts the programs A and B simultaneously (in real-time or near real-time) or alternately/sequentially to read the invisible information F and the symbol printed on the discount seal R.

The code reader 1 decodes the invisible information F read using the program A to generate code information A (e.g., information regarding a commodity) related to the invisible information F. The code information A includes information (information related to the invisible information) indicating that the commodity code and the invisible information F (information regarding an electronic watermark) are read. The information indicating that the invisible information F is read is, for example, information added if the program A reads the information and/or flags information (a code mark) indicating that the information is read. The information indicating that the invisible information F is read may be information indicating the code information A.

The code reader 1 decodes the symbol (discount information) read from the discount seal R using the program B to generate code information B related to the symbol printed on the discount seal R (e.g., information regarding a commodity). The code information B includes the commodity code, the discount information, and information indicating that the discount seal R is read. The information indicating that the discount seal R is read is, for example, information added if the program B reads the information and/or flags information (e.g., a code mark) indicating that the information is read. The information indicating that the discount seal R is read may be information indicating the code information B. The code reader 1 transmits (outputs) the decoded code information A and code information B to the POS terminal 3 via the connection line 5.

The POS terminal 3 performs a commodity registration process related to the commodity T based in part on the code information A received (input) from the code reader 1. The commodity registration process includes a process of calling and displaying commodity information such as a commodity name and/or a price of the commodity T based on the commodity code included in the code information A. The commodity registration process may also include storing the commodity information (which is commodity information A described in more detail below) in a memory (e.g., commodity information storage 331 in FIG. 4). The commodity information may include a commodity code, a commodity name, and information indicating the reading from the invisible information F (the information related to the invisible information).

The POS terminal 3 performs a commodity registration process related to the commodity T based in part on the code information B received (input) from the code reader 1. The commodity registration process includes a process of calling and displaying the commodity name, the price, and the like of the commodity T based on the commodity code included in the code information B. The commodity registration process may also include discounting the commodity based on information related to a discount, and performing a process of displaying a discount amount and a price of the commodity T after the discount. The commodity registration process may also include storing commodity information (which is the commodity information B described in more detail below) in a memory (e.g., commodity information storage 331 in FIG. 4). The commodity information may include a commodity code, a commodity name, a price of the commodity after discount, information related to the discount, and information indicating the reading from the discount seal R.

In traditional/conventional methods, if the commodity T on which the electronic watermark D is printed and the discount seal R is attached is read by the code reader 1, the invisible information F is first read normally and the symbol printed in the symbol portion K is continuously read. In this case, the code reader 1 transmits the code information A related to the decoded invisible information F and the code information B related to the decoded symbol to the POS terminal 3. Accordingly, the POS terminal 3 may perform double registration in which a commodity registration process is performed based on each of the received code information A and the received code information B. As will be described in detail below, when receiving and performing the commodity registration process on the code information B, when code information A (e.g., information regarding the commodity T subjected to the commodity registration process immediately previously is information (read from the electronic watermark D) includes the commodity code of the commodity T such that a commodity code included in the code information A is the same as a commodity code included in the code information B, the POS terminal 3 according to the embodiment erases (deletes) the commodity information related to the code information A subjected to the commodity registration process immediately previously from the commodity information section 331. Therefore, the POS terminal 3 can prevent double registration even if the discount seal R is attached to the commodity T.

The POS terminal 3 performs a settlement process based on the commodity information regarding the commodity T subjected to the commodity registration process. The settlement process is a process of displaying a sum of money or change money (hereinafter referred to as "settlement information") related to a transaction with a customer based on the commodity information regarding the commodity T subjected to the commodity registration process. The settlement process includes a process of dispensing a receipt in which the commodity information regarding the settled commodity T or the settlement information is printed.

Hereinafter, hardware of the code reader 1 will be described. FIG. 3 is a block diagram illustrating an example of a hardware configuration of the code reader 1, according to some embodiments. As illustrated in FIG. 3, the code reader 1 includes a central processing unit (CPU) 11, a read-only memory (ROM) 12, a random access memory (RAM) 13, and a memory section (memory) 14. The CPU 11 serves as a control entity. The ROM 12 stores various programs. The RAM 13 loads a program and/or various kinds of data. The memory section 14 stores various programs. The CPU 11, the ROM 12, the RAM 13, and the memory section 14 are connected to each other via a bus 15. The CPU 11, the ROM 12, and the RAM 13 are configured as a control section 100. That is, the control section (control operator) 100 performs a process of controlling the code reader 1, as will be described below, if the CPU 11 operates in accordance with a control program stored in the ROM 12 and/or the memory section 14 and loaded in the RAM 13.

The RAM 13 includes an image storage section (image storage) 131 and a decoding storage section (decoding storage) 132. The image storage section 131 stores an image of the commodity T captured by the camera 19. The decoding storage section 132 stores decoded information (the code information A) read by starting/executing the program A on an image (stored in the image storage section 131 and obtained by decoding the invisible information F). The decoding storage section 132 stores decoded information (the code information B) read by starting/executing the program B on an image (stored in the image storage section 131 and obtained by decoding information regarding the symbol printed on the discount seal R).

The memory section 14 is configured with a nonvolatile memory such as a hard disc drive (HDD) or a flash memory in which stored information is kept although power is turned off. The memory section 14 also includes a control program section (control program storage) 141 that stores a control program for controlling the code reader 1 (a control program causing the code reader 1 to perform control illustrated in FIG. 5). The control program section 141 stores both the program A and the program B.

The control section 100 is connected to an operation section (input panel) 17, a display section (display) 18, and the camera 19 via the bus 15 and a controller 16.

The operation section 17 is, for example, a keyboard or a touch panel and is operated by an operator of the code reader 1. The display section 18 is, for example, a liquid crystal display section and displays information for the operator of the code reader 1.

The control section 100 is connected to a communication section (communication interface) 20 via the bus 15. The communication section 20 is connected to the POS terminal 3 via the connection line 5 and transmits and receives information to and from the POS terminal 3.

Figure 4:
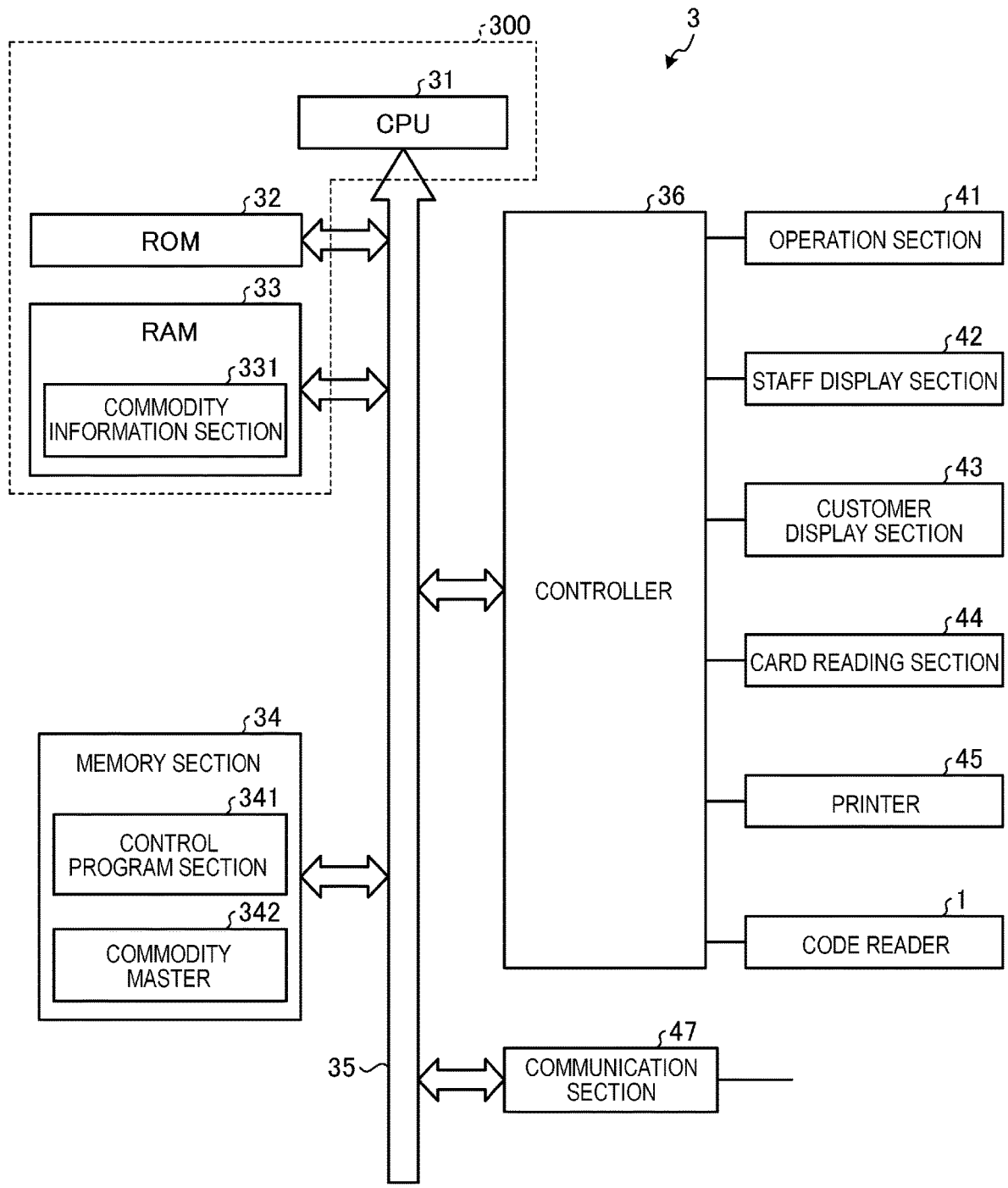
FIG. 4 is a block diagram illustrating an example of a hardware configuration of the POS terminal, according to some embodiments.

Next, hardware of the POS terminal 3 will be described. FIG. 4 is a block diagram illustrating an example of a hardware configuration of the POS terminal 3, according to some embodiments. As illustrated in FIG. 4, the POS terminal 3 includes a CPU 31, a ROM 32, a RAM 33, and a memory section (memory) 34. The CPU 31 serves as a control entity. The ROM 32 stores various programs. The RAM 33 loads a program and/or various kinds of data. The memory section 34 stores various programs. The CPU 31, the ROM 32, the RAM 33, and the memory section 34 are connected to each other via a bus 35. The CPU 31, the ROM 32, and the RAM 33 are configured as a control section (control operator) 300. That is, the control section 300 performs a process of controlling the POS terminal 3, as will be described below, if the CPU 31 operates in accordance with a control program stored in the ROM 32 or the memory section 34 and loaded in the RAM 33.

The RAM 33 includes the commodity information section 331 (a storage section, a commodity information storage). The commodity information section 331 stores commodity information regarding the commodity T subjected to the commodity registration process (a commodity code, a commodity name, a commodity price, information indicating reading information from the electronic watermark D, and/or information indicating information read from the discount seal R, and the like).

The memory section 34 is configured with a nonvolatile memory such as a hard disc drive (HDD) or a flash memory in which stored information is kept although power is turned off. The memory section 34 also stores a control program section (control program storage) 341 that stores a control program controlling the POS terminal 3 (a control program causing the POS terminal 3 to perform control illustrated in FIG. 7) and a commodity master (commodity database) 342. The commodity master 342 stores commodity information (a commodity name, a commodity price, and the like) regarding the commodity T in association with a commodity code for identifying the commodity T to be sold in a store.

The control section 300 is connected to an operation section (input panel) 41, a staff display section (staff display) 42, a customer display section (customer display) 43, a card reading section (card reader) 44, a printer 45, and a code reader 1 via a bus 35 and a controller 36.

The operation section 41 is, for example, a keyboard or a touch panel and is operated by an operator of the POS terminal 3. The staff display section 42 is, for example, a liquid crystal display section and displays information for a staff who is an operator of the POS terminal 3. The customer display section 43 is, for example, a liquid crystal display section and displays information for a customer. The card reading section 44 reads a customer code for identifying a customer from a card (for example, a credit card, electronic money, or the like) used for settlement. The control section 300 of the POS terminal 3 performs a settlement process related to the customer based on the read customer code. The printer 45 dispenses a receipt or a voucher on which commodity information (a commodity name, a commodity price, or the like) or settlement information regarding the commodity T subjected to the commodity registration process is printed. The code reader 1 is connected to the controller 36 via the connection line 5.

The control section 300 is connected to a communication section (communication interface) 47 via the bus 35. The communication section 47 is connected to another POS terminal 3 or a store server (not illustrated) via a communication line and transmits and receives information.

Figure 5:
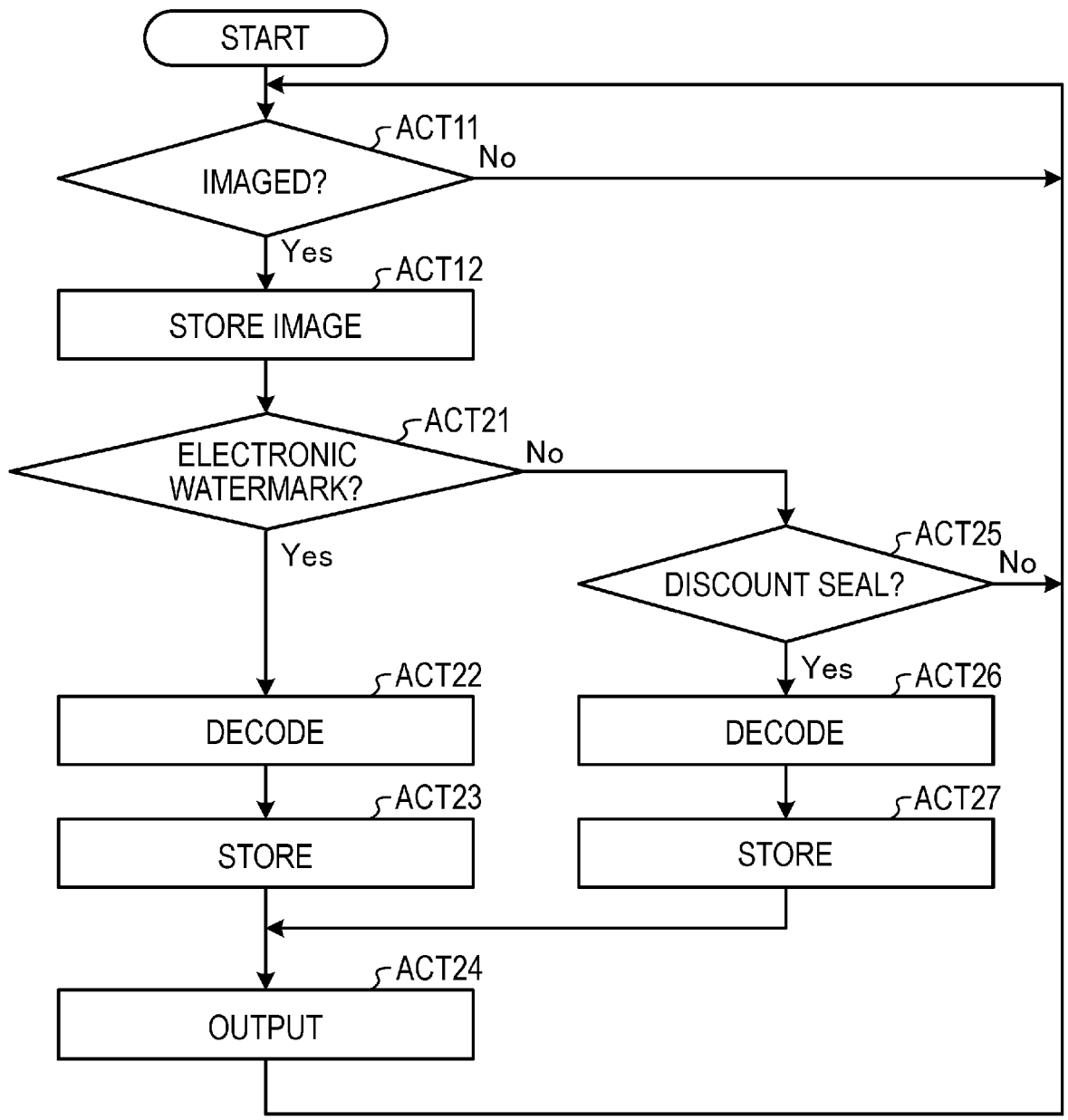
FIG. 5 is a flowchart illustrating an example of a control process of the code reader, according to some embodiments.

Hereinafter, control of the code reader 1 will be described. FIG. 5 is a flowchart illustrating an example of a control process of the code reader 1, according to some embodiments. The operator of the code reader 1 performs an operation of holding the commodity T toward the camera 19. The control section 100 of the code reader 1 determines whether the commodity T (or a portion of commodity T) is captured by the camera 19 (ACT 11). If the control section 100 determines that a portion of commodity T is not captured (no in ACT 11), the operator of the code reader 1 may perform another operation (e.g., holding the commodity T closer to the camera 19, holding the commodity T at a different angle in front of the camera 19, holding the commodity T in an area with more/less light, etc.). If the control section 100 determines that the commodity T is captured by the camera 19 (Yes in ACT 11), the control section 100 stores a captured image in the image storage section 131 (ACT 12).

Subsequently (in response to storing the image), the control section 100 determines whether the started program A reads information regarding the invisible information F from the captured image (ACT 21). That is, program A determines whether the captured image contains invisible information F. If the control section 100 determines that the information regarding the invisible information F is read (Yes in ACT 21), then the control section 100 decodes the read information regarding the invisible information F to generate the code information A (ACT 22). The control section 100 stores the generated code information A in the decoding storage section 132 (ACT 23). The code information A stored in the decoding storage section 132 includes the commodity code and information indicating that the invisible information F is read. The control section 100 transmits (outputs) the stored code information A to the POS terminal 3 via the connection line 5 (ACT 24). Then, the control section 100 returns to ACT 11.

If the program A does not read information regarding the electronic watermark D (No in ACT 21), the control section 100 determines whether the started program B reads information regarding the visualized symbol printed on the discount seal R from the captured image (ACT 25). That is, program B determines whether the captured image contains the discount seal R. If the control section 100 determines that the information regarding the symbol printed on the discount seal R is read (Yes in ACT 25), then the control section 100 decodes the information regarding the symbol to generate the code information B (ACT 26). The control section 100 stores the generated code information B in the decoding storage section 132 (ACT 27). The code information B stored in the decoding storage section 132 includes the commodity code, a discount amount, and information indicating that the discount seal is read. The control section 100 transmits (outputs) the stored code information B to the POS terminal 3 via the connection line 5 (ACT 24). Then, the control section 100 returns to ACT 11.

If the program B determines that the information regarding the visualized symbol is not read from the captured image (for example, if the commodity T is not held, the commodity T is not discounted) (No in ACT 25), the control section 100 returns to ACT 11.

Figure 6:
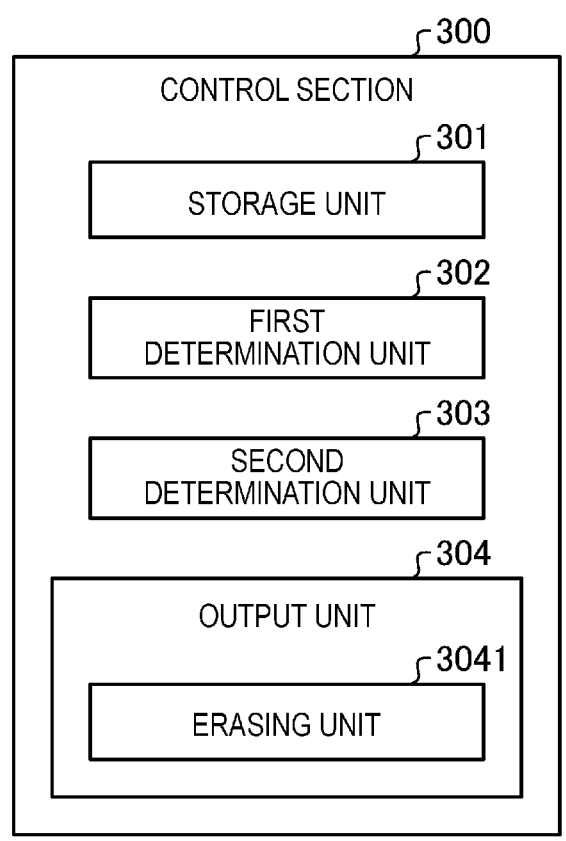
FIG. 6 is a functional block diagram illustrating an example of a functional configuration of the POS terminal, according to some embodiments.

Hereinafter, a functional configuration of the POS terminal 3 will be described. FIG. 6 is a functional block diagram illustrating an example of a functional configuration of the POS terminal 3, according to some embodiments. The control section 300 of the POS terminal 3 functions as a storage unit (storage) 301, a first determination unit (first evaluator) 302, a second determination unit (second evaluator) 303, an output unit (output generator) 304, and/or erasing unit (eraser) 3041 in according with a control program stored in the control program section 341 of the ROM 32 or the memory section 34.

The storage unit 301 stores the commodity information regarding the commodity T acquired by reading the symbol attached to the commodity T in the commodity information section 331. Specifically, the storage unit 301 stores the commodity information A subjected to the commodity registration process in the commodity information section 331 based on the code information A received (input) from the code reader 1. The commodity information A includes the commodity code, the commodity name, and/or the information indicating the reading from the invisible information F. The storage unit 301 stores the commodity information B subjected to the commodity registration process in the commodity information section 331 based on the code information B received (input) from the code reader 1. The commodity information B includes the commodity code, the commodity name, and/or the information indicating the reading from the discount seal R.

If the discount information attached to the commodity T is read, the first determination unit 302 determines whether the prior commodity information (e.g., the commodity information stored immediately previously by the storage unit 301) includes the information related to the invisible information F. Specifically, if the code information B is received, the first determination unit 302 determines whether the prior commodity information stored immediately previously in the storage unit 301 includes the information indicating the reading from the invisible information F.

If the first determination unit 302 determines that the information regarding the commodity T stored immediately previously includes the information indicating the reading from the invisible information F, the second determination unit 303 determines whether the commodity code included in the discount information is identical to (matches) the prior commodity code included in the information regarding the commodity T stored in the commodity information section 331. Specifically, if the prior commodity information A stored immediately previously includes the information indicating the reading from the invisible information F, the second determination unit 303 may determine that the commodity code included in the commodity information B is identical to the commodity code included in the commodity information A.

If the second determination unit 303 determines that the commodity code included in the commodity information B is identical to (matches) the commodity code included in the commodity information A, the output unit 304 does not output the information related to the invisible information F. Specifically, if the second determination unit 303 determines that the commodity code included in the commodity information B is identical to the commodity code included in the commodity information A, the output unit 304 does not output the prior commodity information A stored immediately previously by the storage unit 301 in the commodity information section 331.

The erasing unit 3041 may be an example of the output unit 304. If the second determination unit 303 determines that the commodity code included in the commodity information B is identical to the commodity code included in the commodity information A, the erasing unit 3041 erases the prior commodity information stored immediately previously by the storage unit 301 in the commodity information section 331. Specifically, if the second determination unit 303 determines that the commodity code included in the commodity information B is identical to the commodity code included in the commodity information A, the erasing unit 3041 erases (that is, does not output) the prior commodity information A stored immediately previously by the storage unit 301 in the commodity information section 331.

Figure 7:
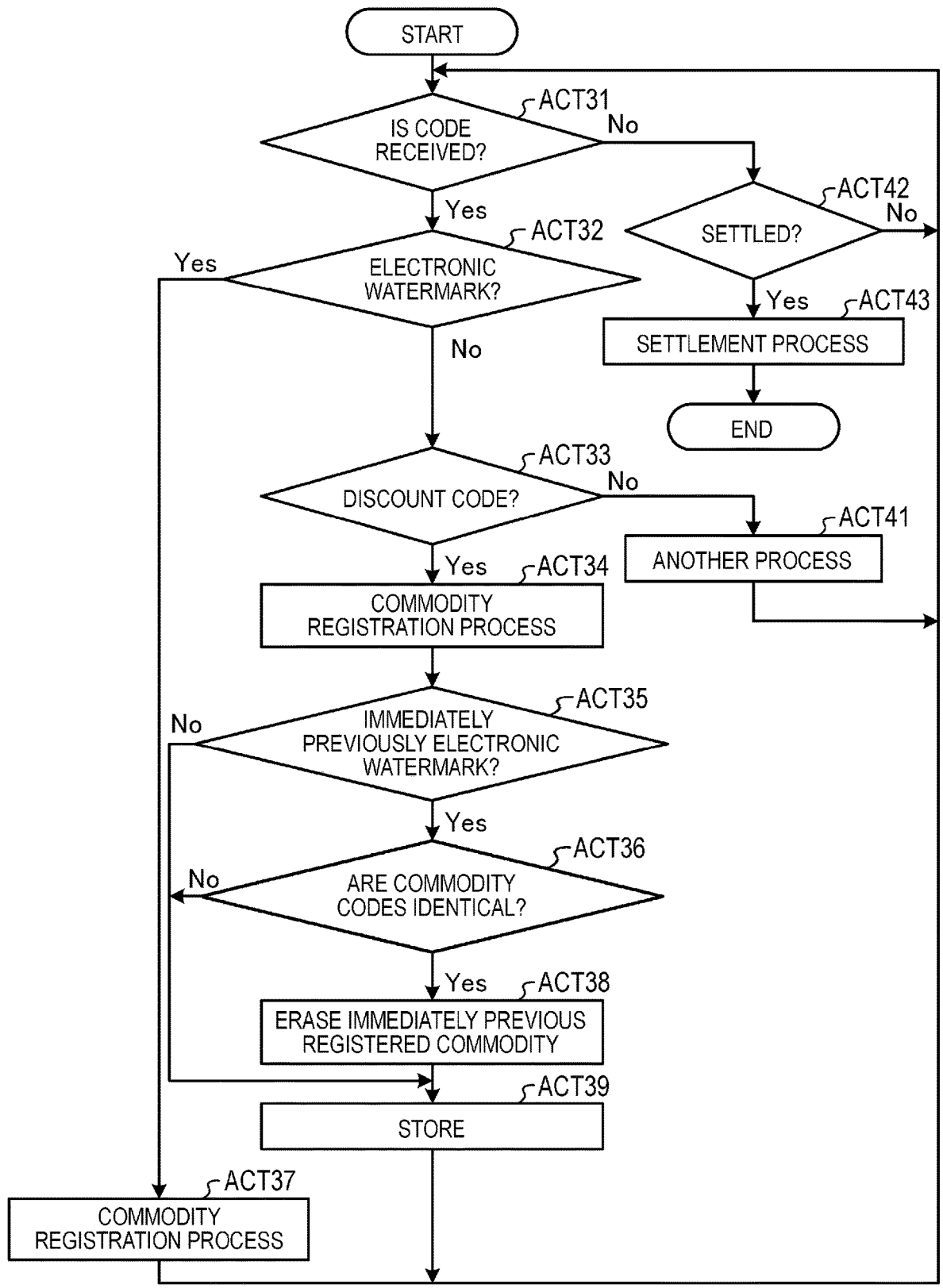
FIG. 7 is a flowchart illustrating an example of a control process of the POS terminal, according to some embodiments.

Next, control of the POS terminal 3 will be described. FIG. 7 is a flowchart illustrating an example of a control process of the POS terminal 3, according to some embodiments. As illustrated in FIG. 7, the control section 300 of the POS terminal 3 determines whether the code information is received (input) (ACT 31). The code information is the code information A or the code information B. If the control section 300 determines that the code information is received (input) (Yes in ACT 31), the control section 300 determines whether the received code information is the code information A (ACT 32). If the control section 300 determines that the received code information is the code information A (Yes in ACT 32), then (i) the storage unit 301 reads the commodity information regarding the commodity T identified by the commodity code included in the received code information A from the commodity master 342; (ii) the control section 300 performs the commodity registration process; and (iii) the control section 300 stores the commodity information A in the commodity information section 331 (ACT 37). The control section 300 may store the commodity information in the commodity information section 331 by putting, for example, a mark (for example, an immediately previous flag) so that the commodity information stored immediately previously (the prior commodity information) is distinguished from other commodity information. If subsequent commodity information is stored, the mark is erased and attached to the subsequent commodity information. In this manner, the mark is associated with the most recently stored commodity information (e.g., the immediately previous commodity information). Alternatively, the commodity information stored immediately previously (the prior commodity information) is stored at a special position, distinguishing the prior commodity information with other previous/historic stored commodity information. Then, the control section 300 returns to ACT 31.

If the control section 300 determines that the received code information is not the code information A (No in ACT 32), the control section 300 determines whether the code information B related to the discount seal R is received (ACT 33). If the control section 300 determines that the code information B is received (Yes in ACT 33), the control section 300 performs the commodity registration process based on the code information (the code information B) related to the discount seal (ACT 34). In the commodity registration process of ACT 34, the commodity information is not yet stored in the commodity information section 331.

The first determination unit 302 determines whether the commodity information stored immediately previously in the commodity information section 331 (the prior commodity information) includes the information indicating the reading from the invisible information F (ACT 35) (e.g., the commodity information read from the invisible information F of the captured image). If it is determined that the commodity information stored immediately previously in the commodity information section 331 includes the information indicating the reading from the invisible information F (Yes in ACT 35), the second determination unit 303 determines whether the commodity code included in the commodity information regarding the commodity T subjected to the commodity registration process in ACT 34 (e.g., the commodity information associated with commodity information B) is identical to (matches) the commodity code included in the commodity information A stored immediately previously in the commodity information section 331 (ACT 36). If it is determined that the commodity codes are not identical to each other (No in ACT 36), the storage unit 301 stores the commodity information (the commodity information B) regarding the commodity T subjected to the commodity registration process in ACT 34 in the commodity information section 331 (ACT 39).

On the other hand, if it is determined that the commodity code included in the commodity information regarding the commodity T is identical to the commodity code included in the commodity information A (Yes in ACT 36), the erasing unit 3041 erases (deletes) the commodity information stored immediately previously in the commodity information section 331 (ACT 38). The storage unit 301 stores the commodity information (the commodity information B) regarding the commodity T subjected to the commodity registration process in ACT 34 in the commodity information section 331 (ACT 39).

If the first determination unit 302 determines that the commodity information stored immediately previously in the commodity information section 331 does not include the information indicating the reading from the invisible information F (No in ACT 35), the storage unit 301 stores the commodity information (the commodity information B) regarding the commodity T subjected to the commodity registration process in ACT 34 in the commodity information section 331 (ACT 39). If it is determined that the code information (that is, the code information B) related to the discount seal R is not received (No in ACT 33), the control section 300 performs another process (ACT 41). Then, the control section 300 returns to ACT 31.

If it is determined in ACT 31 that the code information is not received (No in ACT 31), the control section 300 determines whether a settlement operation is performed (ACT 42). The settlement operation is, for example, an operation on a settlement button (not illustrated) provided in the operation section 41. If it is determined that the settlement operation is performed (Yes in ACT 42), the control section 300 performs the settlement process based on the commodity information stored in the commodity information section 331 (ACT 43) (e.g., the commodity information of commodity information A and/or commodity information B). The control section 300 ends a transaction with the customer. Conversely, if it is determined that the settlement operation is not performed (No in ACT 42), the control section 300 returns to ACT 31.

In this way, the POS terminal 3 according to the first embodiment includes: the commodity information section 331; the storage unit 301 configured to store the commodity information regarding the commodity T acquired by reading the symbol attached to the commodity T in the commodity information section 331; the first determination unit 302 configured to determine (if discount information attached to the commodity T is read) whether the commodity information stored immediately previously by the storage unit 301 (e.g., the prior commodity information) is the commodity information A including information related to the invisible information F; the second determination unit 303 configured to determine (if the first determination unit 302 determines that the commodity information stored immediately previously includes the information indicating the reading from the invisible information F) whether the commodity code included in the commodity information B is identical to the commodity code included in the commodity information A stored in the commodity information section 331; and the erasing unit 3041 configured to erase (if the second determination unit 303 determines that the commodity code included in the commodity information B is identical to commodity code included in the commodity information A) the information regarding the commodity T stored immediately previously in the storage unit 301 from the commodity information section 331.

If the second determination unit 303 determines that both the commodity codes (the commodity code associated with commodity information A and the commodity code associated with commodity information B) are identical to each other, the erasing unit 3041 in the POS terminal 3, according to the first embodiment, erases the information regarding the commodity T stored immediately previously by the storage unit 301 in the commodity information section 331 (e.g., the prior commodity code associated with commodity information A). Accordingly, double registration due to the invisible information F and the discount seal may be prevented.

Second Embodiment

Figure 9:
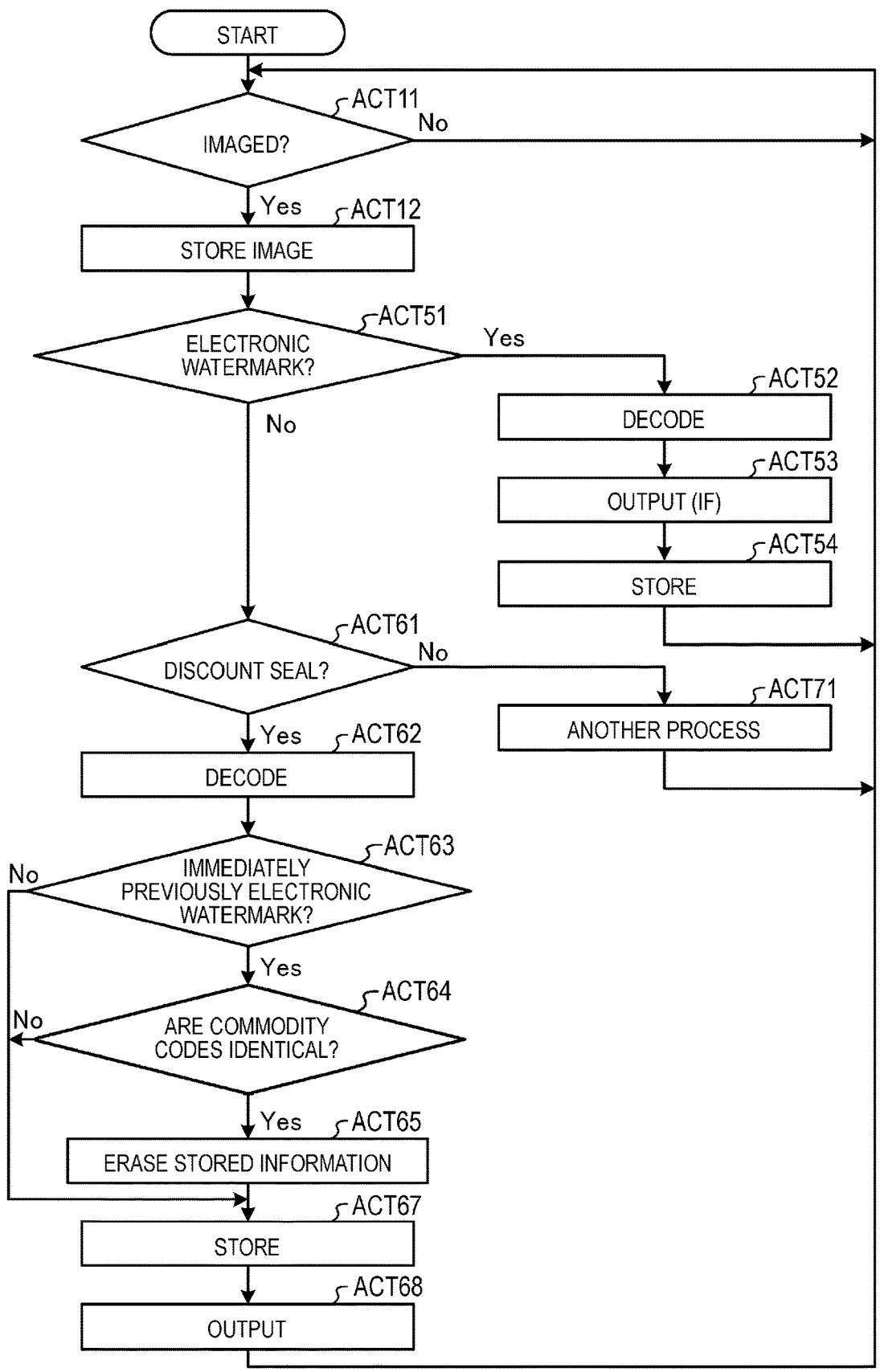
FIG. 9 is a flowchart illustrating an example of a control process of the code reader according to the second embodiment.

A second embodiment will be described below. In the second embodiment, the code reader 1 will be described as an example of the information processing device. It should be appreciated that the second embodiment is an example embodiment of the information processing device, and the method, configurations, functions, and the like do not limit the example embodiment. Some descriptions of configurations in the second embodiment may be similar to those of the first embodiment (the configurations of FIGS. 1 to 3). Accordingly, the configurations of FIGS. 1 to 3 will be omitted or simplified. For example, FIG. 3 may also illustrate a hardware configuration of the code reader 1 according to the second embodiment. The code reader 1 according to the second embodiment differs from that of the first embodiment in the control program stored in the control program section 141. In addition to the programs A and B, a control program causing the code reader 1 to perform control illustrated in FIG. 9 is stored.

Figure 8:
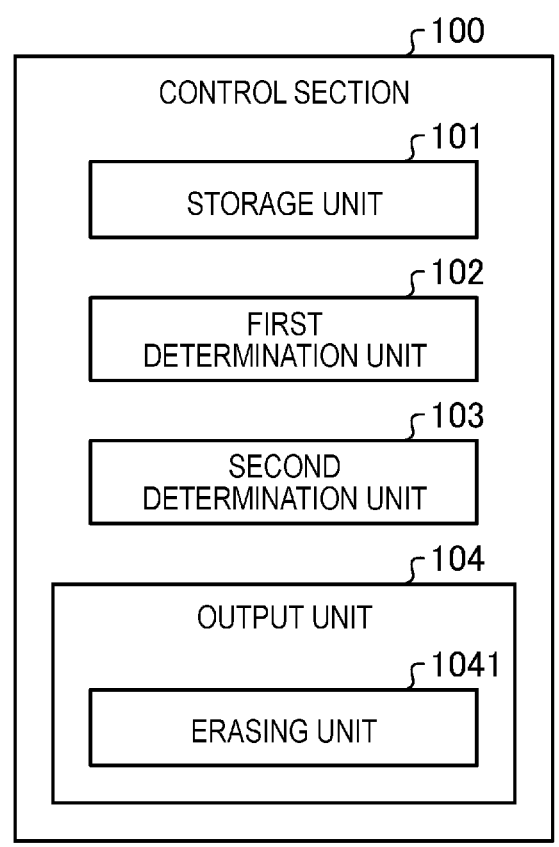
FIG. 8 is a functional block diagram illustrating an example of a functional configuration of a code reader according to a second embodiment.

Next, a functional configuration of the code reader 1 according to the second embodiment will be described. FIG. 8 is a functional block diagram illustrating an example of a functional configuration of the code reader 1 according to the second embodiment. The control section (control operator) 100 of the code reader 1 functions as the storage unit (storage) 101, the first determination unit (first evaluator) 102, the second determination unit (second evaluator) 103, the output unit (output generator) 104, and/or the erasing unit (eraser) 1041 in accordance with the program A, the program B, and the control program stored in the control program section 141 of the memory section 14 and/or the ROM 12.

The storage unit 101 stores code information of the commodity T acquired by reading a symbol attached to the commodity T in the decoding storage section 132 (a storage section, decoding storage). Specifically, the storage unit 101 stores decoded code information A obtained by executing the program A and decoding the invisible information F read from the electronic watermark D in the decoding storage section 132 among other image information captured by the camera 19 and stored in the image storage section 131. The code information A includes a commodity code and/or information indicating the reading from the invisible information F. The storage unit 101 stores decoded code information B obtained by starting the program B and decoding the symbol read from the discount seal R in the decoding storage section 132 among image information captured by the camera 19 and stored in the image storage section 131. The code information B includes a commodity code, a commodity price, a discount amount, and/or information indicating the reading from the discount seal R.

If the discount information attached to the commodity T is read, then the first determination unit 102 determines whether the information regarding the commodity T stored immediately previously by the storage unit 101 (the prior code information A) includes the information related to the invisible information F. Specifically, if the storage unit 101 stores the code information B in the decoding storage section 132, then the first determination unit 102 determines whether the code information stored immediately previously in the storage unit 101 (the prior code information A) includes the information indicating the reading from the invisible information F.

If the first determination unit 102 determines that the information regarding the commodity T stored immediately previously includes the information indicating that the invisible information F is read, then the second determination unit 103 determines whether the commodity code included in the discount information is identical to (matches) the commodity code included in the information regarding the commodity T stored in the decoding storage section 132. Specifically, if it is determined that the information regarding the commodity T stored immediately previously includes the information indicating that the invisible information F is read, the second determination unit 103 determines whether the commodity code included in the code information B (the discount information) is identical to the commodity code included in the code information A.

If the second determination unit 103 determines that the commodity code included in the code information B is identical to the commodity code included in the code information A, the output unit 104 does not output the information related to the invisible information F. Specifically, if the second determination unit 103 determines that the commodity code included in the code information B is identical to the commodity code included in the code information A, the output unit 104 does not output the code information A stored immediately previously by the storage unit 101 in the decoding storage section 132 (e.g., the prior code information A).

The erasing unit 1041 is an example of the output unit 104. If the second determination unit 103 determines that the commodity code included in the code information B is identical to the commodity code included in the code information A, then the erasing unit 1041 erases the code information stored immediately previously by the storage unit 101 in the decoding storage section 132. Specifically, if the second determination unit 103 determines that the commodity code included in the code information B is identical to the commodity code included in the code information A, the erasing unit 1041 erases (that is, does not output) the code information A stored immediately previously in the decoding storage section 132 by the storage unit 101.

If the second determination unit 103 determines that the commodity code included in the code information B is not identical to the commodity code included in the code information A, the erasing unit 1041 outputs the decoded information decoded immediately previously and the decoded discount information to the POS terminal 3 connected to the code reader 1. If the second determination unit 103 determines that the commodity code included in the code information B is identical to the commodity code included in the code information A, the decoded discount information is output to the POS terminal 3. Specifically, if the second determination unit 103 determines that the commodity code included in the code information B is not identical to the commodity code included in the code information A, the erasing unit 1041 outputs the decoded information (the prior code information A) decoded immediately previously and stored in the decoding storage section 132 and the decoded discount information (the code information B) to the POS terminal 3 connected to the code reader 1. If the second determination unit 103 determines that the commodity code included in the code information B is identical to the commodity code included in the code information A, the erasing unit 1041 outputs the decoded discount information (the code information B) to the POS terminal 3.

Next, control of the code reader 1 will be described. FIG. 9 is a flowchart illustrating an example of a control process of the code reader 1 according to the second embodiment. As illustrated in FIG. 9, the control section 100 of the code reader 1 captures the commodity T (ACT 11) and stores the captured image in the image storage section 131 (ACT 12). Subsequently, the control section 100 determines whether the started program A reads the information regarding the invisible information F from the captured image (ACT 51). If the control section 100 determines that the information regarding the invisible information F is read (Yes in ACT 51), the control section 100 decodes the read information regarding the invisible information F to generate the code information A (ACT 52). The code information A includes the commodity code and/or information indicating reading of the invisible information F (the information related to the invisible information).

Subsequently, the control section 100 determines whether the code information A is stored in the decoding storage section 132. If the code information A is stored, the code information A is transmitted to the POS terminal 3 (ACT 53). If the code information A is not stored in the decoding storage section 132, the process of ACT 53 is not performed. Subsequently, the storage unit 101 stores the code information A generated in ACT 52 in the decoding storage section 132 (ACT 54). The code information A stored in the decoding storage section 132 includes the commodity code and information indicating reading of the invisible information F (the information related to the invisible information). That is, the decoding storage section 132 stores the immediately previous code information A (the prior code information A). Then, the control section 100 returns to ACT 11.

If it is determined that the information regarding the invisible information F is not read (No in ACT 51), the control section 100 determines whether the started program B reads the information regarding the symbol printed on the discount seal R from the captured image (ACT 61). If the control section 100 determines that the information regarding the symbol printed on the discount seal R is read (Yes in ACT 61), the control section 100 decodes the information regarding the symbol to generate the code information B (ACT 62). The code information B includes the commodity code, the discount amount, and/or the information indicating that the discount seal is read.

Subsequently, the first determination unit 102 determines whether the code information stored immediately previously in the decoding storage section 132 (the prior code information A) includes the information indicating the reading from the invisible information F (ACT 63). If it is determined that the code information stored immediately previously in the decoding storage section 132 includes the information indicating the reading from the invisible information F (Yes in ACT 63), the second determination unit 103 determines whether the commodity code included in the code information B decoded in ACT 62 is identical to the commodity code included in the code information A stored immediately previously in the decoding storage section 132 (ACT 64). If it is determined that the commodity code included in the code information B is not identical to the commodity code included in the code information A (No in ACT 64), the storage unit 101 stores the code information (the commodity information B) of the commodity T decoded in ACT 62 in the decoding storage section 132 (ACT 67). The output unit 105 transmits (outputs) all the code information (the code information A stored in ACT 54 and the code information B stored in ACT 67) to be stored in the decoding storage section 132 to the POS terminal 3 (ACT 68). Then, the control section 100 returns to ACT 11.

If it is determined that the commodity code included in the code information B is identical to the commodity code included in the code information A (Yes in ACT 64), the erasing unit 1041 erases the code information A stored in ACT 54 from the decoding storage section 132 (ACT 65). The storage unit 101 stores the code information (the commodity information B) of the commodity T decoded in ACT 62 in the decoding storage section 132 (ACT 67). The output unit 105 transmits (outputs) the code information (the code information B stored in ACT 67) stored in the decoding storage section 132 to the POS terminal 3 (ACT 68). Then, the control section 100 returns to ACT 11.

If it is determined that the code information stored immediately previously in the decoding storage section 132 does not include the information indicating the reading from the invisible information F (No in ACT 63), the storage unit 101 stores the code information (the commodity information B) of the commodity T decoded in ACT 62 in the decoding storage section 132 (ACT 67). The output unit 105 transmits (outputs) the code information (the code information B stored in ACT 67) stored in the decoding storage section 132 to the POS terminal 3 (ACT 68). Then, the control section 100 returns to ACT 11.

In this way, the code reader 1 according to the second embodiment includes: the decoding storage section 132; the storage unit 101 configured to store the information regarding the commodity T acquired by reading the symbol attached to the commodity T in the decoding storage section 132; the first determination unit 102 configured to determine (if discount information attached to the commodity T is read) whether the commodity T information (the code information A) stored immediately previously by the storage unit 101 includes information related to the invisible information F; the second determination unit 103 configured to determine (if the first determination unit 102 determines that the information regarding the commodity T stored immediately previously includes the information related to the invisible information F) whether the commodity code included in the discount information is identical to commodity code included in the code information A; and the erasing unit 1041 configured to erase (if the second determination unit 103 determines that the commodity code included in the discount information is identical to the commodity code included in the code information A) the code information A stored immediately previously in the storage unit 101 from the decoding storage section 132.

If the second determination unit 103 determines that both the commodity codes (the commodity code associated with code information A and the commodity code associated with code information B) are identical to each other, the code reader 1, according to the second embodiment erases the information regarding the commodity T stored immediately previously by the storage unit 101 in the decoding storage section 132. Accordingly, double registration due to the invisible information F and the discount seal may be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the first and second embodiments, a case where the commodity code is included in the invisible information F is described. However, the example embodiment is not limited thereto and the commodity code stored in advance in another memory provided in the code reader 1 or the POS terminal 3 may be acquired based on the invisible information F.

In the first and second embodiments, the electronic watermark D is printed on a commodity. However, the example embodiment is not limited thereto. For example, labels on which the electronic watermark D is printed may be attached to a plurality of surfaces of a commodity.

In the first and second embodiments, the erasing units (3041 and 1041) are used as an example of the output units (304 and 104) in the description. However, the example embodiment is not limited thereto. The output units (304 and 104) may be other units other than the erasing units (3041 and 1041) as long as the commodity information stored immediately previously (prior commodity information) or decoded information (prior code information) is not output.

The programs executed in the code reader 1 or the POS terminal 3 according to the first and second embodiments are recorded and provided as files with an installable format or an executable format on a computer-readable recording medium such as a CD-ROM, a flexible disc (FD), a CD-R, or a digital versatile disk (DVD).

The programs executed in the code reader 1 and the POS terminal 3 according to the first and second embodiments may be stored on a computer connected to a network such as the Internet and may be downloaded via the network to be provided. The programs executed in the code reader 1 and the POS terminal 3 according to the first and second embodiments may be provided or distributed via a network such as the Internet.

The programs executed in the code reader 1 and the POS terminal 3 according to the first and second embodiments may be each embedded in a ROM or the like to be provided.

What is claimed is:

1. An information processing device comprising:
a camera configured to read a symbol attached to a commodity and capture an image containing discount information attached to the commodity, and read invisible information printed on one or more surfaces of the commodity, wherein the invisible information is invisible to a human eye;
a storage storing information regarding the commodity acquired by reading the symbol attached to the commodity; and
one or more processors configured to:
decode the invisible information;
determine whether prior commodity information stored in the storage includes information related to the invisible information, in response to reading discount information attached to the commodity;
determine whether commodity identification information included in the discount information is identical to commodity identification information included in the information related to the invisible information, in response to determining that the prior commodity information stored in the storage includes the information related to the invisible information; and
output information related to the discount information, in response to determining that the commodity identification information included in the discount information is identical to the commodity identification information included in the information related to the invisible information.

2. The information processing device according to claim 1, wherein the information processing device is a commodity sales data processing device.

3. The information processing device according to claim 1, wherein the camera is a code reader configured to execute:
a program A configured to read the symbol related to the invisible information; and
a program B configured to read the discount information attached to the commodity.

4. The information processing device according to claim 1, wherein
the storage stores at least the storage, the first storage storing commodity information determined via a commodity registration process based on information read by the camera regarding the commodity.

5. The information processing device according to claim 1, wherein the prior commodity information is commodity information stored immediately previously by the storage.

6. The information processing device according to claim 1, wherein the the one or more processors are configured to erase the prior commodity information, in response to determining that the commodity identification information included in the discount information is identical to the commodity identification information included in the commodity information.

7. The information processing device according to claim 1, wherein:

the storage stores decoded information obtained by decoding the image captured by the camera, the stored decoded information including prior decoded information stored immediately previously by the storage.

8. The information processing device according to claim 7, wherein the one or more processors are configured to determine whether the prior decoded information stored by the storage includes the information related to the invisible information, in response to the captured image containing the discount information attached to the commodity.

9. The information processing device according to claim 7, wherein the one or more processors are configured to determine whether the commodity identification information included in the discount information is identical to commodity identification information included in the prior decoded information.

10. The information processing device according to claim 7, wherein the one or more processors are configured to erase the prior decoded information, in response to determining that the commodity identification information included in the discount information is identical to commodity identification information included in the decoded information.

11. The information processing device according to claim 7, wherein the one or more processors are configured to output the decoded information and decoded discount information to a commodity sales data processing device connected to the information processing device, in response to determining that the commodity identification information included in the discount information is not identical to commodity identification information included in the decoded information.

12. The information processing device according to claim 7, wherein the one or more processors are configured to output the decoded discount information to a commodity sales data processing device connected to the information processing device, in response to determining that the commodity identification information included in the discount information is identical to commodity identification information included in the decoded information.

13. A method for preventing double registration comprising:
reading a symbol attached to a commodity or discount information attached to the commodity, and reading invisible information printed on one or more surfaces of the commodity, wherein the invisible information is invisible to a human eye;
storing information regarding the commodity acquired by reading the symbol;
decoding, by the one or more processors, the invisible information;
responsive to reading discount information, determining, by one or more processors, whether stored prior commodity information includes information related to invisible information;
responsive to determining that the prior commodity information includes the information related to invisible information, determining, by the one or more processors, whether commodity identification information included in the discount information is identical to commodity identification information included in the information related to the invisible information; and
responsive to determining that the commodity identification information included in the discount information is identical to the commodity identification information included in the information related to the invisible information, outputting information related to the discount information.

14. The method of claim 13, wherein the prior commodity information is commodity information stored immediately previously by a storage.

15. The method of claim 13, further comprising:
responsive to determining that the commodity identification information included in the discount information is identical to the commodity identification information included in the commodity information, erasing, the prior commodity information.

16. The method of claim 13, further comprising:
responsive to determining that a captured image contains discount information attached to the commodity, determining, by the one or more processors, whether stored prior decoded information includes the information related to the invisible information.

17. The method of claim 13, further comprising:
determining, by the one or more processors, whether the commodity information included in the discount information is identical to commodity information included in stored prior decoded information.

18. The method of claim 13, further comprising:
erasing stored prior decoded information in response to determining that the commodity identification information included in the discount information is identical to commodity identification information included in decoded information obtained by decoding a captured image.

19. The method of claim 13, further comprising:
responsive to determining that the commodity identification information included in the discount information is not identical to commodity identification information included in decoded information obtained by decoding a captured image, outputting the decoded information and decoded discount information to a commodity sales device.

20. The method of claim 13, further comprising:
responsive to determining that the commodity identification information included in the discount information is identical to commodity identification information included in decoded information obtained by decoding a captured image, outputting the decoded discount information to a commodity sales device.

* * * * *